United States Patent Office 2,821,488
Patented Jan. 28, 1958

2,821,488

SUBSTITUTED AMMONIUM PHENATES

James L. Jezl, Swarthmore, Pa., assignor to Sun Oil Company, Philadelphia, Pa., a corporation of New Jersey No Drawing. Application September 23, 1953
Serial No. 381,996

17 Claims. (Cl. 117—138.5)

This invention relates to new chemical compounds having fungicidal and rodent repellent activity.

The compounds according to the invention are naphthenoxyalkylamine salts of phenols and naphthenyl amine salts of halogenated phenols. These compounds are ammonium salts of phenols which salts have at least one naphthenyl or naphthenoxyalkyl substituent on the nitrogen atom. A naphthenyl substituent for the purposes of the present invention is a radical represented by the formula R— or $RCH_2$—, where R is derived from a petroleum naphthenic acid, RCOOH, or a mixture of such acids, and a naphthenoxyalkyl radical is a radical having the formula $RCOOC_nH_{2n}$—. The naphthenic acids of commerce are complex mixtures of carboxylic acids, and therefore the compositions of the invention, derived from such acids, will usually be mixtures of compounds in which the R radical varies from compound to compound.

The substituted ammonium phenates according to the invention contain at least one naphthenyl or naphthenoxyalkyl substituent on the nitrogen atom. Greater numbers of naphthenyl or napthenoxyalkyl substituents may be present on the nitrogen atom. Other substituents may also be present on the nitrogen atom.

Preferred naphthenoxyalkyl amine phenates according to the invention are those having the following formula:

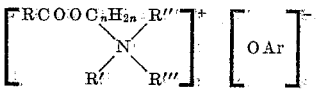

where R′, R″, and R‴ are selected from the group consisting of hydrogen, naphthenyl ($RCH_2$), naphthenoxyalkyl ($RCOOC_nH_{2n}$), aliphatic, haloaliphatic, cycloaliphatic, araliphatic, oxyaliphatic, hydroxyaliphatic, carboxyaliphatic, aminoaliphatic, and amidoaliphatic radicals, where R′, R″, and R‴ each have molecular weight not greater than 300, where $n$ is an integer from 1 to 20 inclusive, and where Ar is an aryl radical. R′, R″, and R‴ may be straight or branched chain, saturated or unsaturated (containing one or more double bonds) radicals; saturated radicals are preferred; preferably each such radical has not more than 25 carbon atoms.

Preferred naphthenyl amine halophenates according to the invention are those having the following formula:

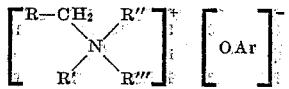

where R is a radical derived from petroleum naphthenic acid, RCOOH, where R′, R″, and R‴ are selected from the group consisting of hydrogen, naphthenyl ($RCH_2$), naphthenoxyalkyl ($RCOOC_nH_{2n}$), $n$ being an integer from 1 to 20 inclusive), aliphatic, haloaliphatic, cycloaliphatic, araliphatic, oxyaliphatic, hydroxyaliphatic, carboxyaliphatic, aminoaliphatic, and amidoaliphatic radicals, where R′, R″, and R‴ each have molecular weight not greater than 300, and where Ar is a halogenated phenyl radical. R′, R″, and R‴ may be straight or branched chain, saturated or unsaturated (containing one or more double bonds) radicals; saturated radicals are preferred; preferably, each such radical has not more than 25 carbon atoms.

The compounds according to the invention can be prepared by reacting a naphthenyl amine or a naphthenoxyalkyl amine with a phenol, or by reacting a naphthenyl amine halide or a naphthenoxyalkyl amine halide with an alkali metal phenate. A naphthenoxyalkyl halide can be prepared for example by esterifying a halogenated alkanol, such as ethylene chlorohydrin, with naphthenic acids.

Naphthenyl amines which may be used to prepare a salt according to the present invention may be prepared from naphthenic acids by any suitable method. One such method involves the reaction of ammonia with naphthenic acids to form the corresponding nitrile, RCN, and the reduction of the nitrile to the amine by means of metallic sodium. The nitrile may alternatively be reduced to the amine by known methods for reaction of hydrogen with the nitrile. In the reduction by means of metallic sodium, it is believed that mainly primary amines are obtained. In the hydrogenation method it is believed that secondary and tertiary amines are also obtained in substantial amount. If desired, suitable known means for separating primary, secondary, and tertiary amines from one another can be employed.

Secondary and tertiary amines can be prepared from primary amines by reacting the latter in known manner with a halide or sulfate of the radical which is to replace one or more of the hydrogen atoms attached to the nitrogen atom, or by condensing and reducing the primary amine with an aldehyde or ketone.

The reaction of a naphthenyl amine or naphthenoxyalkyl amine with a phenolic compound can be accomplished by admixing the amine and phenol with stirring until the materials have reacted to form the salt. Advantageously, the reaction may be conducted in the presence of a solvent such as pentane or other volatile organic solvent, which solvent can if desired be stripped from the salt when the reaction is completed. If the ultimate use of the product formed is such that a solution of the product is desired for that use, the same solvent can be used during the preparation so that the desired solution is the product obtained. The amine and the phenolic compound are preferably used in amounts to provide approximately equal number of molar equivalents. The reaction occurs satisfactorily at room temperature, and higher temperatures are not required, though higher temperatures, e. g. up to 250° F., may be used if desired.

Quaternary ammonium compounds according to the invention can be prepared by reaction of quaternary ammonium halides with a metal phenate. Thus, for example, a trinapthenyl amine can be reacted with an alkyl halide to form a quaternary ammonium halide and the latter can be reacted with an alkali metal phenate to form a quaternary ammonium phenate.

A naphthenoxyalkyl amine phenate according to the invention is a substituted ammonium salt of a compound or compounds from the class of monohydric phenols, polyhydric phenols and naphthols. Salt-forming phenols generally are suitable for preparation of such compounds according to the invention. Such phenols are considered to include, for the purposes of the present invention, both monocyclic and polycyclic aromatic compounds having at least one hydroxyl group directly attached to an aromatic nucleus. Monohydric phenols are preferred, but salt-forming polyhydric phenols can also be used. Monocyclic phenols are preferred, but salt-forming polycyclic phenols, such as naphthols, can be used. Examples of suitable phenols are: phenol itself; halogenated phenols such as pentachlorophenol, o-chlorophenol, m-chlorophenol, p-bromophenol, 2-bromo-4-phenyl-phenol, 2,4,6-trichlorophenol, 2,4,6-tribromophenol; 2,2'-dihydroxy-5-5'-dichlorodiphenyl methane; 2,2'-dihydroxy-3,5,6,3',5',6'-hexachlorodiphenyl methane; hydrocarbon-substituted phenols such as o-cresol, m-cresol, p-cresol, anol, eugeneol, isoeugenol, carvacrol, thymol, o-cyclohexyl phenol, p-cyclohexylphenyl, o-hydroxydiphenyl, p-hydroxydiphenyl; nitrated phenols such as o-nitrophenol, p-nitrophenol, 2,4-dinitrophenol, picric acid; other substituted phenols such as guaiacol, o-hydroxyacetophenone, p-hydroxyacetophenone; alpha-naphthol, beta-naphthol; catechol, resorcinol, hydroquinone, pyrogallol, phloroglucinol, etc.

A naphthenyl amine halophenate according to the invention is a substituted ammonium salt of a halogenated phenol such as pentachlorophenol, o-chlorophenol, m-chlorophenol, p-bromophenol, 2,4,6-trichlorophenol, 2,4,6-tribromophenol, etc.

Examples of compounds according to the invention are the following: mononaphthenoxyethyl ammonium pentachlorophenate, mononaphthenoxyethyl diethyl ammonium pentachlorophenate, di(naphthenoxyethyl) ammonium phenate, tri(naphthenoxyethyl) ammonium cresylate, mononaphthenoxyethyl monomethyl ammonium nitrophenate, dinaphthenoxypropyl monobutyl ammonium o-cyclohexylphenate, tri (naphthenoxybutyl) ammonium salt of anol, mononaphthenoxyhexyl ammonium dinitrophenate, mononaphthenoxydecyl ammonium salt of eugenol, mononaphthenoxyhexadecyl ammonium salt of isoeugenol, mononaphthenoxymethyl eicosyl ammonium naphtholate, di (mononaphthenoxyethyl mono (aminohexenyl) ammonium) salt of catechol, tetra(naphthenoxyethyl) ammonium pentachlorophenate, di(naphthenoxyethyl) di (octadecyl) ammonium phenate, mononaphthenyl monohexenyl ammonium pentachlorophenate, dinaphthenyl monocyclohexylmethyl ammonium o-chlorophenate, trinaphthenyl monocyclohexydecyl ammonium m-chlorophenate, mononaphthenyl dibenzyl ammonium p-chlorophenate, mononaphthenyl monophenyloctyl ammonium m-bromophenate, mononaphthenyl mono (hydroxyethyl) ammonium 2,4,6-trichlorophenate, dinaphthenyl mono (hydroxyhexadecyl) ammonium 2,4,6-tribromophenate, mononaphthenyl mono (aminoethyl) ammonium pentachlorophenate, mononaphthenyl mono (aminohexenyl) ammonium dichlorophenate, mononaphthenyl mono (acetamidoethyl) ammonium pentachlorophenate, dinaphthenyl mono (acetyloxyethyl) ammonium pentachlorophenate, mononaphthenyl mono (betachloroethyl) ammonium pentachlorophenate.

Also constituting examples of compounds according to the invention are the naphthenyl amine halophenates corresponding to each naphthenoxyalkyl amine phenate given above, e. g. mononaphthenyl eicosyl ammonium pentachlorophenate corresponding to mononaphthenoxymethyl eicosyl ammonium naphtholate, and the naphthenoxyalkyl compounds corresponding to each naphthenyl amine given above, e. g. mononaphthenoxyethyl dibenzyl ammonium p-chlorophenate corresponding to mononaphthenyl dibenzyl ammonium p-chlorophenate, etc.

Any suitable petroleum naphthenic acids can be used to prepare compounds according to the invention. Relatively high molecular weight naphthenic acids, having saponification number for example within the range from 120 to 200 mg. of KOH per gram are used to advantage in preparing compounds according to the invention, but lower molecular weight acids, having saponification number on the oil-free basis for example within the range from 200 to 320, can also be used.

The novel compounds according to the invention have been found to have exceptionally good properties for use as fungicides, rodent repellents, bactericides, disinfectants, rot-proofing agents, ingredients of antifouling marine paints, etc. The compounds are useful in the various applications of fungicidal materials such as in the treating of textiles, wood, paper, leather, etc., as constituents of paints and other protective coatings, etc. The compounds are soluble in pentane, petroleum spirits, acetone, linseed oil, and other organic solvents, and solutions of the compounds in such solvents can be employed in such applications. The amount of naphthenyl or naphthenoxy ammonium phenate used as fungicide will generally be within the range from 0.01 to 5.0 percent based on the weight of the material to which the fungicide is applied.

The compounds according to the invention are also useful in protection of materials from attack by rodents. Thus, according to the invention, materials normally subject to attack by rodents are treated with a naphthenyl or naphthenoxyalkyl ammonium phenate. Various means can be employed for applying such compounds to materials for protection against rodents. The phenate can be deposited on an article to be protected by applying an aqueous dispersion of the phenate in water, the dispersion being formed with the aid of a wetting or dispersing agent, to the article being protected. Aqueous solutions of water-soluble quaternary salts can also be used. Known types of adhesive or sticking agents can be added to the dispersion to prevent the repellent from being removed by rain or other forms of moisture. The phenates can be incorporated in coating materials such as paraffin or microcrystalline wax, and the wax composition applied to the article to be protected, e. g. a paper package. The phenates can be incorporated in plastic coating and film forming materials or in paper pulp, or can be deposited on fibers from which bags are to be made, and the phenate-containing composition can then be made up into packaging means. The phenates can also be mixed with suitable dry porous diluents such as clays, talc, and the like and employed as dusts to protect stored goods. The amount of phenate used as rodent repellent will generally be within the range from 0.01 to 5.0 percent based on the weight of the material to which the phenate is applied.

The novel compounds according to the invention are also useful in the preparation of anti-rust and extreme pressure lubricating compositions comprising a major proportion of mineral lubricating oil and a minor proportion, e. g. 0.01 to 10 weight percent, of a compound according to the invention.

The following examples illustrate the invention.

*Example 1*

Petroleum napthenic acids having saponification number of 181 mg. of KOH per gram, indicating average molecular weight of 310, were reacted with ammonia to form the corresponding nitrile, and the latter was reduced with metallic sodium to form the corresponding amine. The latter was then reacted with pentachlorophenol to form naphthenyl amine pentachlorophenate.

The preparation of the nitrile was as follows: the naphthenic acids were heated to 250–300° C. and anhydrous ammonia was passed through the acids at that temperature until the evolution of water substantially ceased. The product formed was vacuum distilled to obtain a distillate comprising the napththenic acid nitrile.

The preparation of the amine was as follows: 200 grams of molten sodium were admixed with 500 cc. of toluene, and one mole of the nitrile prepared as described above, dissolved in 500 cc. of n-butyl alcohol, was added slowly with stirring. The heat evolved caused violent boiling, and the reaction mixture was maintained under reflux conditions. 900 cc. of additional butyl alcohol were added slowly and the reaction mixture was refluxed for four hours. More toluene was added from time to time to maintain a suitably low viscosity. The reaction products were washed with water to remove sodium hydroxide formed. Then the alcohol and toluene were stripped off to obtain a residue containing the naphthenyl amine. Acetic acid was added to the residue to form the amine acetate. The residue was then dissolved in isopropanol and extracted with naphtha to remove the nitrile. The amine acetate was then neutralized with caustic soda to liberate the amine. The aqueous layer was separated, and isopropanol stripped from the amine. The amine was distilled under vacuum to obtain a distillate having a boiling range in the neighborhood of 300–500° F./5 mm. Hg. This amine had an HCl equivalent of 124 mg. of HCl per gram, indicating an average molecular weight of about 294, as compared with the theoretical molecular weight of 295 for the primary amine. The close correspondence of these molecular weights indicates that predominantly the primary amine was obtained.

The preparation of the reaction product of the amine with pentachlorophenol was as follows: 9.7 grams of the amine (0.033 molar equivalents) and a solution of 8.8 grams of technical pentachlorophenol (0.033 molar equivalents) in 25 ml. of n-pentane were admixed at room temperature with stirring for about 15 minutes. Pentane was stripped from the reaction product. The residue obtained was naphthenylamine pentacholorophenate, a buff-colored friable solid having in the powdered state a mild odor of pentachlorophenol. The compound contained 34.2 percent chlorine, as compared with a theoretical chlorine content of 31.7 percent, and contained 2.24 percent nitrogen, as compared with a theoretical nitrogen content of 2.5 percent. The theoretical chlorine and nitrogen contents are based on the following formula:

where R is the naphthenyl radical derived from petroleum naphthenic acids, RCOOH, having average molecular weight of 310.

The naphthenyl amine pentachlorophenate prepared as described above was found to be soluble in pentane, petroleum spirits, or acetone in amounts greater than 100 grams of per 100 ml. of solvent, and to be soluble in heat-boiled linseed oil in amounts greater than 50 grams per 100 ml. of solvent. The solutions obtained were nearly odorless.

In order to test the fungicidal activity of the naphthenyl amine pentachlorophenate, a 2 percent solution of that material in petroleum spirits was prepared. A 4″ by 7″ bleached muslin panel was impregnated with an equal weight of this solution and then air-dried to evaporate the spirits and to leave in the panel about 2 parts of the naphthenyl amine pentachlorophenate per 100 parts of cloth. The panel was then buried vertically in a bed of moist mushroom soil for 3 weeks at room temperature.

For purposes of comparison, two other panels of the same type of muslin were subjected to the same test in mushroom soil. One of these panels contained no added fungicide. The other was impregnated with about 2 parts per 100 of a rosin amine pentachlorophenate prepared by reacting a rosin amine known by the trademark "Rosin Amine D" with pentachlorophenol in a manner generally similar to that described above for the preparation of the naphthenyl amine pentachlorophenate.

At the end of the three week period, the effects of the test on the three panels were observed. The following table shows the results:

| Fungicide | Condition of Portion of Panel Immersed in Soil |
|---|---|
| None | Completely destroyed. |
| Rosin amine pentachlorophenate | Contained four or five holes one-eighth inch or more in major dimension; several smaller holes. |
| Naphthenyl amine pentachlorophenate | Contained only one hole, and that one less than one-sixteenth inch in major dimension. |

This test shows the highly effective fungicidal action to the invention as compared to the prior art fungicide, rosin amine pentachlorophenate.

Example 2

A naphthenoxyethyl diethyl ammonium pentachlorophenate having the following formula:

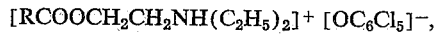

where RCOO is a naphthenic acid residue and $C_6Cl_5$ is the pentachlorophenyl radical, was prepared and tested as a fungicide. The preparation involved the reaction of petroleum naphthenic acids having saponification number of 167.8 mg. of KOH per gram with diethyl ethanolamine, $HOCH_2CH_2N(CH_2CH_3)_2$, to form a naphthenoxyethyl diethyl amine, $RCOOCH_2CH_2N(CH_2CH_3)_2$, and reaction of the latter amine with pentachlorophenol to form the naphthenoxyethyl diethyl ammonium pentachlorophenate.

The preparation of the naphthenoxyethyl diethyl amine was as follows: 250 grams (0.748 mole) of naphthenic acids (sap. No. 167.8) were admixed with 96.4 grams (0.748 mole) of diethyl ethanolamine and 200 ml. of toluene, and the mixture was heated to 250–267° F. under refluxing conditions for 7 hours and then to 375–85° C. under refluxing conditions for 5 hours. Toluene was then stripped off to leave a residue comprising mainly the desired amine. This residue was washed with caustic soda to remove unreacted naphthenic acids. The remaining amine weighed 305 grams and had the following properties: saponification number 119.0, acidity 2.08 mg. of KOH per gram, refractive index $n_d^{20}$ 1.4861, specific gravity $d_4^{20}$ 0.9460, viscosity 46.1 S. U. S. at 210° F. bromine number 0 and HCl equivalent 80.6 mg. of HCl per gram.

The preparation of the pentachlorophenate was as follows: 1.238 grams of the napthenoxyethyl diethyl amine prepared as described above were admixed at room temperature with 100 ml. of petroleum spirits as solvent and 0.762 gram of technical pentachlorophenol, and the mixture stirred for about 15 minutes. The reaction between the amine and the pentachlorophenol occurred quite rapidly to produce a solution of about 2 percent of the amine pentachlorophenate in petroleum spirits.

In order to test the fungicidal properties of the amine pentachlorophenate, a 4″ by 7″ panel of bleached muslin was impregnated with a weight of the above solution equal to the weight of the panel. The panel was then air-dried to evaporate the solvent and to leave the panel impregnated with 2 percent of the amine pentachlorophenate based on the weight of the panel.

The panel was then buried vertically in a bed of moist mushroom soil for three weeks at room temperature. For purposes of comparison, another panel of the same type of muslin was subjected to the same test. This panel was untreated and contained no added fungicide.

At the end of the three week period, the effects of the subjection to the test conditions were observed for each panel. The following table shows the results:

| Fungicide | Condition of Portion of Panel Buried in the Soil |
|---|---|
| None | Completely destroyed. |
| Naphthenoxyethyl diethyl ammonium pentachlorophenate. | Substantially intact; some small holes in the panel; total area of holes less than one-half square inch. |

This example shows that naphthenoxyethyl diethyl ammonium pentachlorophenate is effective in preserving a textile material under conditions normally producing severe attack by fungi.

In the preceding examples, naturally occurring petroleum naphthenic acids were used to prepare the derivatives in question. Similar results may be obtained employing, instead of such naturally occurring acids, carboxylic acids obtained by partial oxidation of petroleum hydrocarbon fractions containing substantial quantities, e. g. at least a major proportion of naphthenic hydrocarbons. The term, petroleum naphthenic acids, as used herein, is to be considered as including acids obtained by such partial oxidation as well as naturally occurring acids. Typical oxidation conditions which may be employed in partial oxidation include: temperature 200° F. to 300° F., pressure atmospheric to 500 p. s. i. g., oxidizing agent air, oxygen, ozone, ozonized air, $H_2O_2$, etc., catalyst, if any, of the well known metal oxidation catalyst, e. g. manganese naphthenate, etc.

The invention claimed is:

1. A naphthenyl ammonium halophenate derived from petroleum naphthenic acids having saponification number not substantially greater than 320 mg. of KOH per gram.

2. A compound having the following formula:

$$[RCH_2NH_3]^+ [OC_6Cl_5]^-,$$

where R is derived from petroleum naphthenic acids, RCOOH, having saponification number not substantially greater than 320 mg. of KOH per gram and where $C_6Cl_5$ is the pentachlorophenyl radical.

3. A compound having the following formula:

$$[RCOOCH_2CH_2NH(CH_3CH_2)_2]^+ [OC_6Cl_5]^-,$$

where RCOO is a naphthenoxy radical derived from petroleum naphthenic acids, RCOOH, having saponification number not substantially greater than 320 mg. of KOH per gram and where $C_6Cl_5$ is the pentachlorophenyl radical.

4. A material normally subject to attack by fungi, to which material phenol salts of naphthenic acid esters of a hydroxyalkyl amine which esters are derived from petroleum naphthenic acids having saponification number not substantially greater than 320 mg. of KOH per gram have been uniformly applied.

5. A material normally subject to attack by fungi, to which material a naphthenyl ammonium halophenate derived from petroleum naphthenic acids having saponification number not substantially greater than 320 mg. of KOH per gram has been uniformly applied.

6. A packaging material, normally subject to attack by fungi, impregnated with phenol salts of naphthenic acid esters of a hydroxyalkyl amine which esters are derived from petroleum naphthenic acids having saponification number not substantially greater than 320 mg. of KOH per gram.

7. A packaging material, normally subject to attack by fungi, impregnated with a naphthenyl ammonium derived from petroleum naphthenic acids having saponification number not substantially greater than 320 mg. of KOH per gram.

8. A new composition of matter selected from the group consisting of phenol salts of naphthenic acid esters of a hydroxyalkyl amine which esters are derived from petroleum naphthenic acids having saponification number not substantially greater than 320 mg. of KOH per gram and halophenol salts of naphthenyl amines derived from such naphthenic acids.

9. Phenol salts of naphthenic acid esters of a hydroxyalkyl amine which esters are derived from petroleum naphthenic acids having saponification number not substantially greater than 320 mg. of KOH per gram.

10. A material normally subject to attack by fungi or rodents, to which material a composition selected from the group consisting of phenol salts of naphthenic acid esters of a hydroxyalkyl amine and halophenol salts of naphthenyl amines has been uniformly applied, which composition is derived from petroleum naphthenic acids having saponification number not substantially greater than 320 mg. of KOH per gram.

11. A packaging material, normally subject to attack by fungi or rodents, impregnated with a composition selected from the group consisting of phenol salts of naphthenic acid esters of a hydroxyalkyl amine and halophenol salts of naphthenyl amines, which composition is derived from petroleum naphthenic acids having saponification number not substantially greater than 320 mg. of KOH per gram.

12. Composition according to claim 8 wherein the saponification number of the naphthenic acids is not substantially greater than 200 mg. of KOH per gram.

13. Composition according to claim 8 wherein the salts are soluble in n-pentane to an extent of at least 100 grams per 100 milliliters of n-pentane at ordinary temperature.

14. A composition having the following formula:

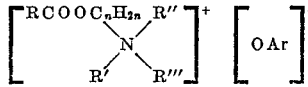

where R is a radical derived from petroleum naphthenic acids, RCOOH, having saponification number not substantially greater than 320 mg. of KOH per gram, where n is an integer from 1 to 4 inclusive, where R', R", and R''' are selected from the group consisting of hydrogen and alkyl radicals having 1 to 4 carbon atoms, and Ar is a halophenyl radical.

15. A composition having the following formula:

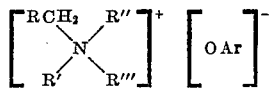

where R is a radical derived from petroleum naphthenic acids, RCOOH, having saponification number not substantially greater than 320 mg. of KOH per gram, where R', R", and R''' are selected from the group consisting of hydrogen and alkyl radicals having 1 to 4 carbon atoms, and AR is a halophenyl radical.

16. A composition adapted for protecting material from attack by fungi or rodents, said composition comprising a hydrocarbon solvent having dissolved therein a material as defined in claim 8.

17. Method for protecting material from attack by fungi or rodents which comprises impregnating material normally subject to attack by fungi or rodents with a hydrocarbon solution of a material as defined in claim 8.

References Cited in the file of this patent

UNITED STATES PATENTS

| | | |
|---|---|---|
| 1,989,325 | Lommel | Jan. 29, 1935 |
| 2,363,561 | Smith et al. | Nov. 28, 1944 |
| 2,448,910 | Reamer | Sept. 7, 1948 |
| 2,541,816 | Glarum | Feb. 13, 1951 |